Jan. 24, 1956     L. C. CAMPBELL ET AL     2,732,052
CONTROL APPARATUS FOR GRAIN DISTRIBUTING SPOUTS
Filed Dec. 14, 1953     2 Sheets-Sheet 1
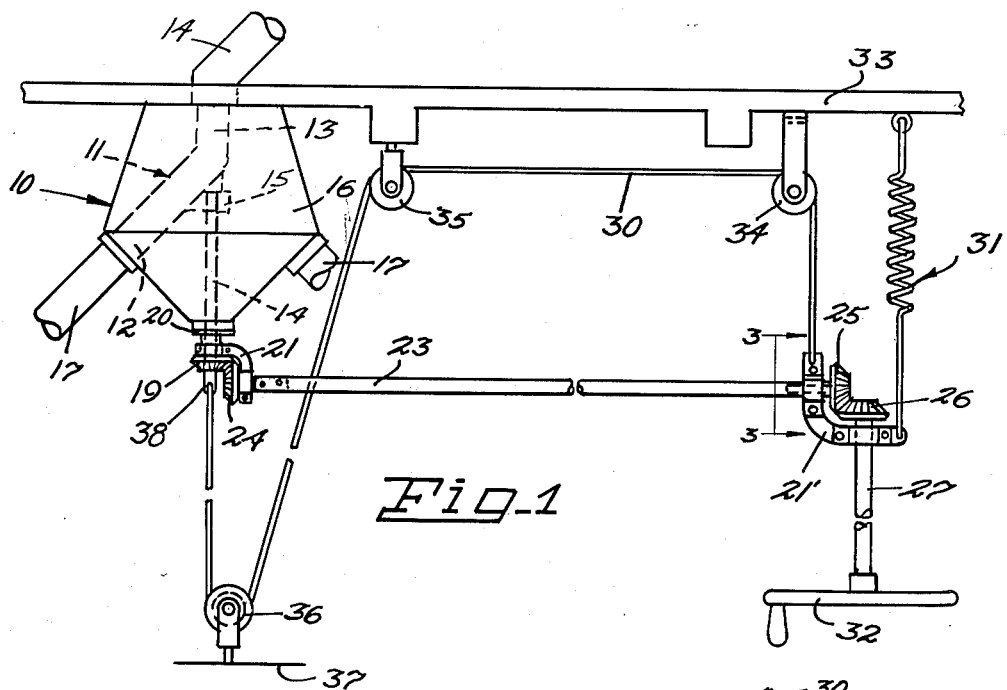
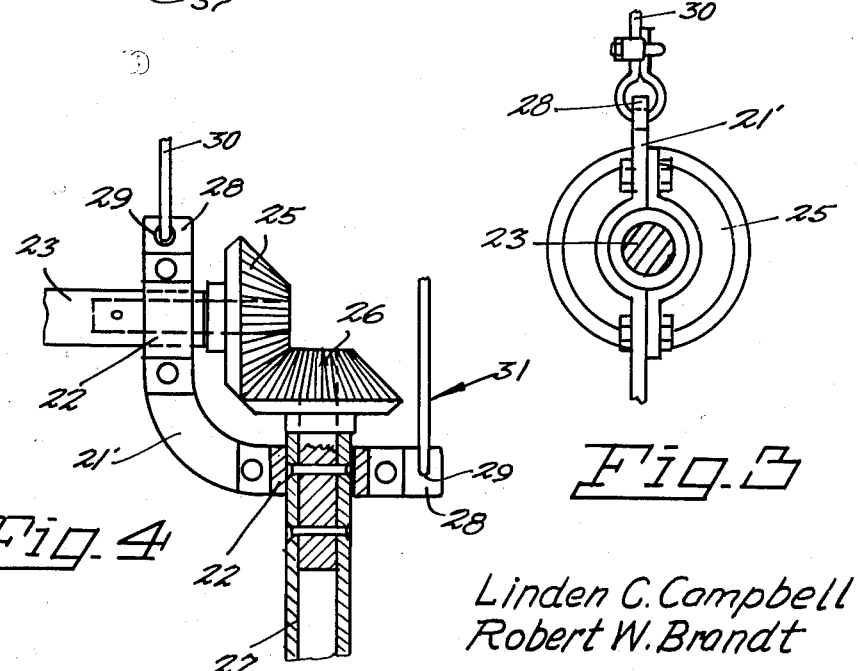
Linden C. Campbell
Robert W. Brandt
INVENTOR.
BY
*Glenn L. Fish*
ATTORNEY Jan. 24, 1956   L. C. CAMPBELL ET AL   2,732,052
CONTROL APPARATUS FOR GRAIN DISTRIBUTING SPOUTS
Filed Dec. 14, 1953   2 Sheets-Sheet 2

Linden C. Campbell
Robert W. Brandt
INVENTORS

BY

ATTORNEY

United States Patent Office 2,732,052
Patented Jan. 24, 1956

2,732,052

CONTROL APPARATUS FOR GRAIN DISTRIBUTING SPOUTS

Linden C. Campbell and Robert W. Brandt, Spokane, Wash.

Application December 14, 1953, Serial No. 397,976

3 Claims. (Cl. 193—23)

This invention relates to grain distributors and more particularly to control apparatus whereby the distributor spout may be manually moved to selected ones of plural pipes and accurately positioned in communication therewith.

One object of the invention is to provide controls for a rotary distributor spout whereby the spout may be manually moved from one pipe to another and accurately positioned in communication with the selected pipe.

Another object of the invention lies in the provision of manually operable control means having two independent connections, one designed to control the spout location latch and the other adapted to rotate the spout from one pipe to another.

Another object of the invention lies in the provision of grain distributing spout controls which render it possible to have direct control of the spout location and thereby preclude the possibility of unintentionally mixing grains.

Another object of the invention is to generally improve the positioning mechanism for grain distributing spouts.

These and other objects of the invention will become apparent during the course of the following description.

In the accompanying drawings, forming a part of this specification, and in which like numerals are employed to designate like parts:

Figure 1 is a view in side elevation showing my improved grain distributor controls and having parts broken away for convenience of illustration;

Figure 3 is a vertical view partially in cross section and partially in elevation as at line 3—3 of Figure 1; and Figure 4 is a view in side elevation with parts in cross section showing the intermeshing miter gears between the crank shaft and driving shaft.

Figure 2:
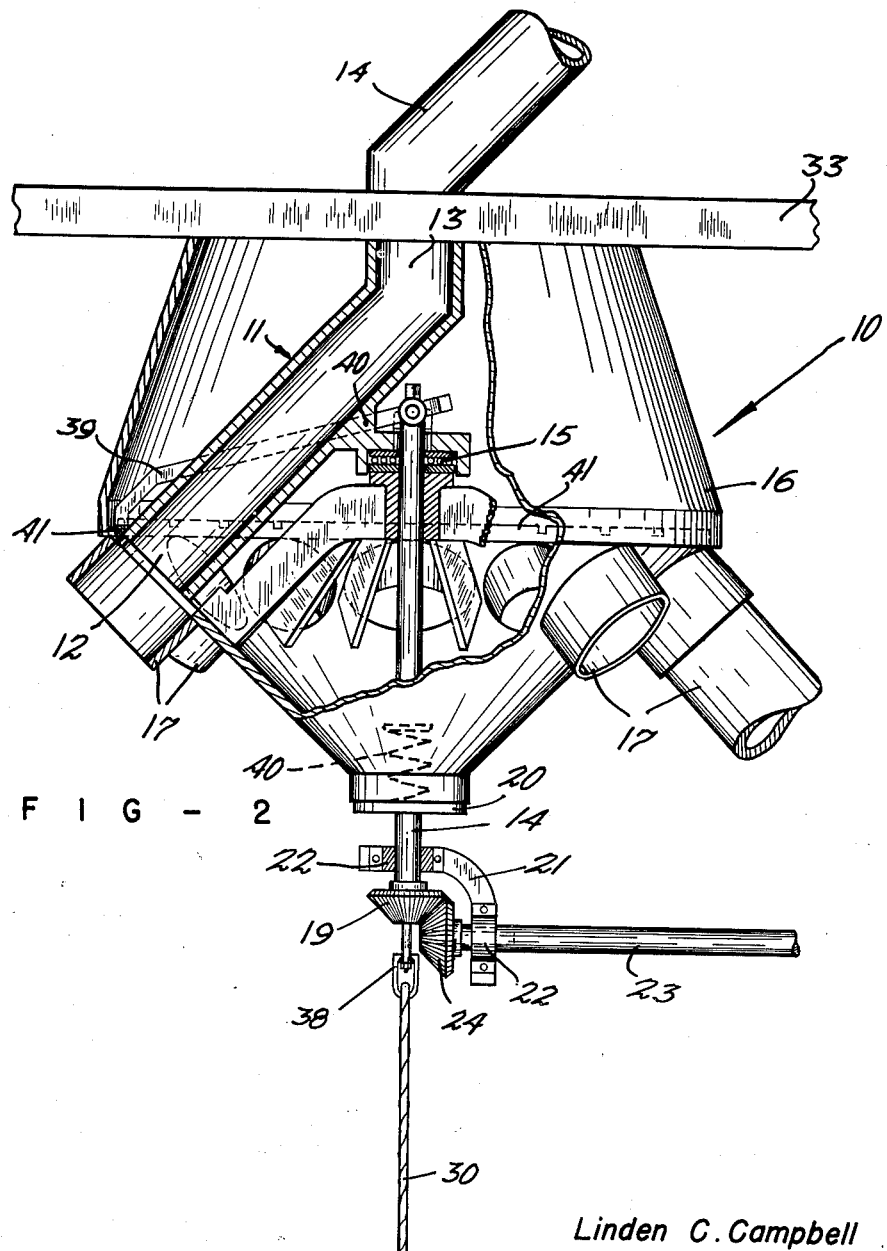
Figure 2 is a vertical cross section through the grain distributor taken upon an enlarged scale.

Referring now more particularly to the drawing, I have indicated a grain distributor by the numeral 10. The grain distributor includes a spout 11 having its discharge end 12 disposed at a downward and outward incline and at its upper end 13 communicates with a supply pipe 14 which may be conventionally supplied with grain from the elevating mechanism. The spout 11 is rotatable about a vertical axis defined by the distributor shaft 14 and is supported by means of a thrust bearing 15 carried within the housing 16 of the grain distributor 10. A plurality of pipes 17 have their upper ends communicating with the housing 16 and are arranged in the annular path traversed by the mouth of the discharge end 12 of the distributor spout 11. The distributor shaft 14 extends downwardly through the housing 16 and is provided with a miter or bevel gear 19 fixed thereto and spaced from its lower end. The shaft 14 is supported on bearings indicated at 20 and carried by the housing 16.

A yoke 21 is provided with bearings or bushings similar to those shown at 22 of Figure 4 and the yoke rotatably positions the horizontally extending driving shaft 23 having a miter or bevel gear 24 on its inner end and intermeshing with the cooperating gear 19 on the distributor shaft 14. It is thus obvious that rotation of the driving shaft 23 will cause distributor shaft 14 to rotate.

The driving shaft 23 may be carried by any number of support bearings (not shown) which may be located in walls or on standards as found necessary to position the outer end thereof at any desired location removed from the grain distributor 10. At its outer free end the driving shaft is provided with a bevel or miter gear 25 which intermeshes with a bevel or miter gear 26 carried by the upper end of a crank shaft 27. The gears 25 and 26 are maintained in intermeshing relation by means of a yoke 21' having conventional bearings or bushings 22 for rotatably supporting the driving shaft and crank shaft.

The yoke 21' is provided with extensions 28 on the ends thereof and these extensions are apertured at 29; one to receive and secure a cable or other flexible operating connection 30 and the other to receive and secure the end of a tension spring indicated in general by the numeral 31. Obviously the crank shaft 27 may be of any length desired and the grain distributor may be disposed at the top of the grain elevator while the manual crank lever 32 may be positioned on the main floor in the weigh room or other operating room of the grain elevator. It is also obvious that, if desired and practical, the manually operable crank lever 32 may be applied directly to the driving shaft 23 and in this event, the tension spring 31 will be secured to the same extension 28 as the cable 30.

The extension spring 31 is secured at its upper end to a support beam or other stationary portion of the elevator indicated at 33 in Figures 1 and 2. The cable 30 is trained about a series of pulleys 34, 35, and 36. Pulleys 34 and 35 are secured to the head or ceiling of the room in which the driving shaft is located and pulley 36 is secured to the floor, as at 37 of Figure 1, and disposes the terminal flight of cable 30 in axial alignment with the distributor shaft 14. Thus the cable extends upwardly from pulley 36 and is secured by means of swivel 38 to the distributor shaft 14. It is therefore obvious that downward pull on the crank lever 32 will move the crank shaft 27 downwardly, longitudinally stretching tension spring 31 and also pulling on cable 30, thus lowering distributor shaft 14. As the distributor shaft 14 lowers, the latch mechanism 39 is pivoted over its fulcrum 40 and is raised from the retaining ring 41 whereupon rotation of crank 32 will cause the spout 11 to move from one pipe 17 to another and the latch 39 may again enter a recess 42 disposed to accurately locate the spout in communication with a pipe 17 when the crank lever is permitted to raise. It is apparent from Figure 2 that the weight of the latch mechanism 39 is sufficient to maintain the distributor shaft 14 in its upper position with the latch 39 communicating with a slot 42. If necessary, however, spring 40 may be associated with the distributor shaft 14 to insure its proper normal location.

Having thus described our invention, we claim:

1. In a grain distributing spout having latch means for accurately positioning said spout in communication with selected ones of plural pipes the improvement comprising; a vertically disposed rotatable distributor shaft fixed to said spout and reciprocable with relation thereto; a spring yieldably holding said distributor shaft in its normal longitudinal raised position; said distributor shaft being operably connected to selectively actuate said latch means when moved from its normal position; an angularly disposed driving shaft operably connected to said distributor shaft for simultaneous rotation; manually operated means operably connected to said driving shaft for selective manual rotation; said manually operated means being yieldably supported for manual reciprocation; and a flexible cable secured to said manually operated means and connected for axial pull on said distributor shaft whereby the distributor shaft may be reciprocated or rotated independently of the other movement.

2. In a grain distributing spout having latch means for accurately positioning said spout in communication with selected ones of plural pipes the improvement comprising; a vertically disposed rotatable distributor shaft fixed to said spout and reciprocable with relation thereto; a spring yieldably holding said distributor shaft in its normal longitudinal raised position; said distributor shaft being operably connected to selectively actuate said latch means when moved from its normal raised position; a driving shaft disposed at right angles to said distributor shaft and rotatably connected therewith by means of beveled gears; means supporting said driving shaft relative to said distributor shaft with said bevel gears meshing and carried only by said shafts; the end of said driving shaft opposed to said bevel gears being adapted for manual rotation and transverse movement; and a flexible operating cable connected between the last named end of said driving shaft and said distributor shaft for reciprocating said distributor shaft independently of the rotational movement.

3. In a grain distributing spout having latch means for accurately positioning said spout in communication with selected ones of plural pipes the improvement comprising; a vertically disposed rotatable distributor shaft fixed to said spout and reciprocable with relation thereto; a spring yieldably holding said distributor shaft in its normal longitudinal raised position; said distributor shaft being operably connected to selectively actuate said latch means when moved from its normal raised position; a driving shaft disposed at right angle to said distributor shaft and operably connected thereto by means of intermeshing bevel gears; a manually operated crank shaft operably connected to the opposed end of said driving shaft by means of intermeshing bevel gears whereby the distributor shaft may be rotated; said manually operated crank shaft being yieldably supported by means of a tension spring; a cable secured relative to said crank shaft and actuated by movement of said crank shaft against the tension of said spring; said cable extending through a series of anchored pulleys and at its end opposed to said crank shaft being axially aligned with and secured to said distributor shaft, whereby the distributor shaft may be reciprocated independently of its rotary movement.

References Cited in the file of this patent

UNITED STATES PATENTS

| | | |
|---|---|---|
| 647,749 | Hall | Apr. 17, 1900 |
| 1,145,215 | Roney | July 6, 1915 |